United States Patent [19]
Wiseman et al.

[11] 3,810,007
[45] May 7, 1974

[54] HOLIDAY DETECTOR AND COATING RESISTIVITY CHECKER

[75] Inventors: Minor R. Wiseman; Rondon L. Schroeder, both of Ponca City, Okla.

[73] Assignee: Continental Oil Company, Ponca City, Okla.

[22] Filed: July 23, 1973

[21] Appl. No.: 381,792

[52] U.S. Cl. .................................. 324/62, 324/52
[51] Int. Cl. ............................................. G01r 27/02
[58] Field of Search .......................... 324/62, 64, 52

[56] References Cited
UNITED STATES PATENTS
2,440,044  4/1948  Greenslade ...................... 324/64
2,460,688  2/1949  Gambrill et al. .................. 324/52

*Primary Examiner*—Stanley T. Krawczewicz
*Attorney, Agent, or Firm*—William J. Miller

[57] ABSTRACT

A portable, accurate, non-destructive holiday detector and resistivity coating checker employing electronic resistance bridge means for comparing the resisitivity of non-conducting coatings to a standard resistance value either in the field or in plants where such coatings are applied to metallic vessels, pipes or the like and providing respective signal outputs proportional to the coating resistivity and the standard resistance. The apparatus employs comparator means for comparing the two outputs of the resistance bridge, and an alarm responsive to the output of the comparator means for indicating the presence of a holiday in the non-conducting coating under test where the coating resistivity is less than the standard resistance value. Probe means are also disclosed for providing electrical contact with the surface of the non-conducting coatings under test. Also disclosed is a method of checking coating resistivity for the detection of holidays therein.

13 Claims, 2 Drawing Figures

HOLIDAY DETECTOR AND COATING RESISTIVITY CHECKER

BACKGROUND OF THE INVENTION

1. Field of the Invention

This invention relates generally to improvements in checking the resistivity of non-conducting materials, and more particularly, but not by way of limitation, to the checking of resistivity of non-conducting coatings on metallic vessels or pipes and the detection of holidays in such coatings.

2. Description of the Prior Art

The prior art includes teachings of the application of a low-voltage d.c. source to a non-conducting protective coating and obtaining an indication at the resistivity from a reading on a galvanometer. Another known method for checking such coatings employs the substitution of chemical means for the galvonometer to indicate the presence of a break in the coating under test by color change in the chemical means. Another method, described as the dielectric method, has been used but this method is accompanied by the hazard of spark discharge and is inappropriate for testing of coatings having low break-down potential.

SUMMARY OF THE INVENTION

The present invention contemplates an apparatus for automatically comparing the resistivity of a non-conducting coating on a metallic vessel or the like to a predetermined standard minimum resistance value, and providing indication where the resistivity of the non-conducting coating falls below the predetermined standard minimum resistance value. The apparatus includes a voltage source; an electronic resistance bridge circuit having first and second legs electrically connected in parallel to the voltage source; and a variable resistance in the first leg of said resistance bridge circuit and electrically connected in series between said voltage source and the first side of said resistance bridge circuit. The apparatus further includes a probe or sensor in the second leg of said resistance bridge circuit, electrically connected in series between the voltage source and the second side of the resistance bridge circuit, the probe being adapted to connect the metallic vessel and the non-conducting coating in series between said voltage source and the second side of said resistance bridge circuit.

The apparatus further includes a comparator electrically connected to the first side and the second side of said resistance bridge circuit for comparing the current flowing through the metallic vessel and the non-conducting coating with the current flowing through said variable resistance, and providing a signal output when the current flowing through the metallic vessel and the non-conducting coating is greater than the current flowing through said variable resistance; and, indicator means electrically connected to said comparator and responsive to the signal output therefrom for indicating the presence of the signal output from said comparator.

An object of the invention is to provide a small, portable, accurate apparatus for the non-destructive checking of resistivity of a non-conducting coating and for the detection of holidays therein.

Another object of the invention is to provide an improved holiday detector and coating resistivity checker which is self-contained and provides visual indication of the standard resistance against which the resistivity of the non-conducting coating is being compared.

A further object of the invention is to provide a holiday detector and coating resistivity checker which is capable of providing rapid, accurate testing of non-conducting coatings to standards as established by the National Association of Corrosion Engineers.

A still further object of the invention is to provide a rapid, accurate method of checking the resistivity of a non-conducting coating and detecting any holidays formed therein.

Yet another object of the invention is to provide a holiday detector and coating resistivity checker which is economical in construction and operation.

Other objects and advantages of the invention will be evident from the following detailed description when read in conjunction with the accompanying drawing.

DESCRIPTION OF THE PREFERRED EMBODIMENT

Figure 1:
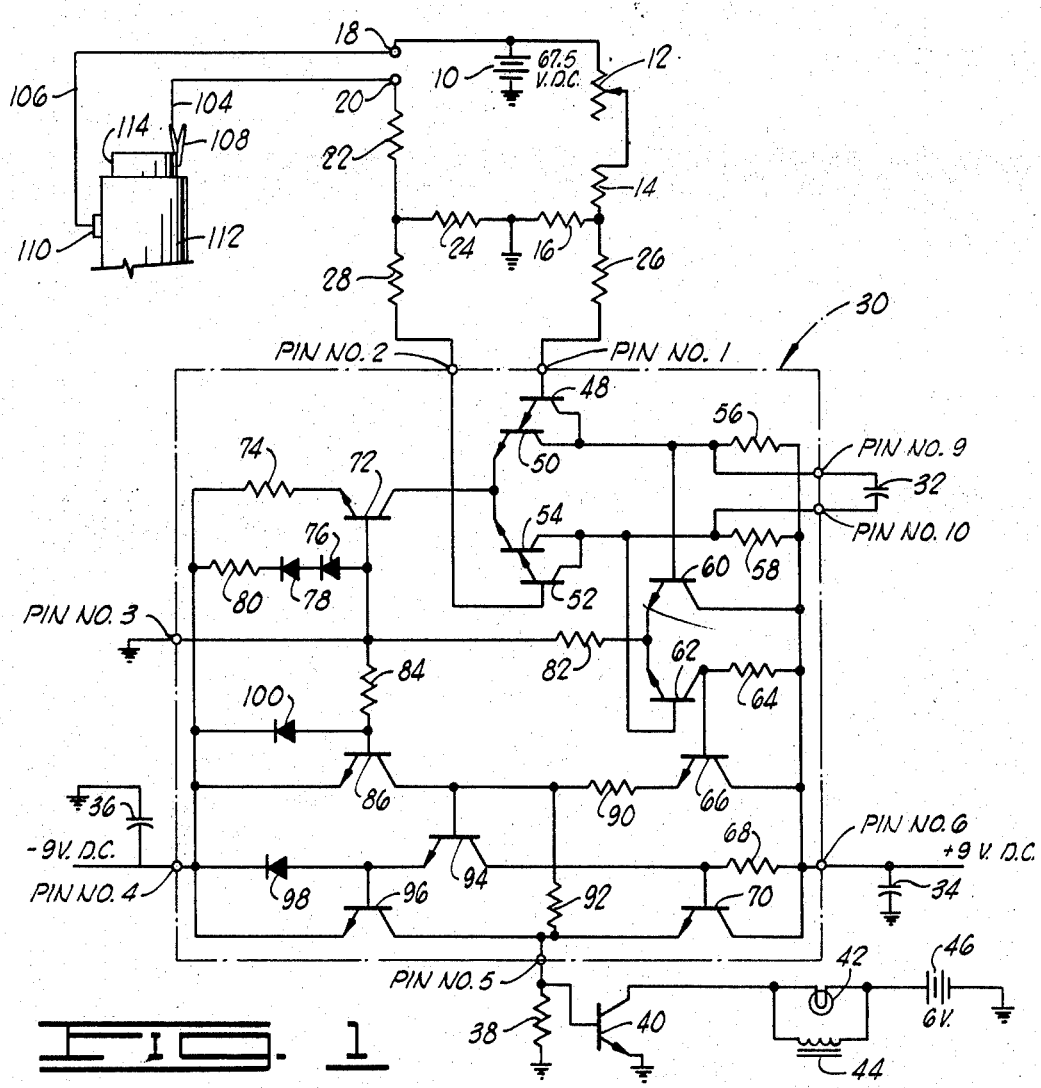
FIG. 1 is a schematic diagram of the apparatus of the present invention.

Referring now to the drawing and to FIG. 1 in particular, there is illustrated therein a schematic diagram of the holiday detector and coating resistivity checker apparatus of the present invention.

A d.c. voltage source or battery 10 is connected at its negative pole or terminal to ground. A potentiometer 12 is connected to the positive pole or terminal of the battery 10. The potentiometer 12 is preferably of the type having a visible readout and requiring 10 turns to vary the resistance from 0 to 100 K. The potentiometer 12 is connected in series with a resistor 14. A resistor 16 is connected in series with the resistor 14 and ground. The potentiometer 12 and resistors 14 and 16 comprise the first leg of an electronic resistance bridge.

The positive terminal of the battery 10 is also connected to a first probe terminal 18. A second probe terminal 20 is connected to a resistor 22. The resistor 22 is connected in series with a resistor 24 which is, in turn, connected to ground. The probe terminals 18 and 20 and the resistors 22 and 24 comprise the second leg of the electronic resistance bridge. The resistors 14 and 16 are connected at the first side of the resistor bridge to a resistor 26. The resistors 22 and 24 are connected at the second side of the resistance bridge to another resistor 28.

The resistor 26 is connected to pin no. 1 of a conventional solid state comparator, such as the Motorola MC1531G comparator. The comparator will be designated by the reference character 30. The resistor 28 is connected to pin no. 2 of the comparator 30. A capacitor 32 is connected between pin no. 9 and pin no. 10 of the comparator 30.

A positive d.c. voltage source is connected to pin no. 6 of the comparator 30. A capacitor 34 is connected between pin no. 6 of the comparator 30 and ground.

A negative d.c. voltage source is connected to pin no. 4 of the comparator 30. A capacitor 36 is connected between pin no. 4 of the comparator 30 and ground, and pin no. 3 of the comparator 30 is connected to ground. Pin no. 5 of the comparator 30 is connected to a resistor 38, and the resistor 38 is in turn connected to ground.

The base of an NPN transistor 40 is connected to pin no. 5 of the comparator 30. The emitter of the transistor 40 is connected to ground. An indicator light 42 and a suitable audible alarm 44 are connected in parallel between the collector of the transistor 40 and the positive terminal of a d.c. voltage source or battery 46. The negative terminal of the battery 46 is connected to ground.

The comparator 30 includes the following solid state circuit network. Pin no. 1 of comparator 30 is connected to the base of an NPN transistor 48. The emitter of the transistor 48 is connected to the base of another NPN transistor 50. The collectors of the transistors 48 and 50 are interconnected.

Pin no. 2 of the comparator 30 is connected to the base of an NPN transistor 52, the emitter of the transistor 52 is connected to the base of another NPN transistor 54. The collectors of the transistors 52 and 54 are then interconnected.

A resistor 56 is connected in series between the collectors of the transistors 48 and 50 and pin no. 6 of the comparator 30. Another resistor 58 is connected in series between the collectors of the transistors 52 and 54 and pin no. 6 of the comparator 30. It will be noted that the collectors of the transistors 48 and 50 are also connected to pin no. 9 of the comparator 30, while the collectors of the transistors 52 and 54 are connected to pin no. 10 of the comparator 30.

The collectors of the transistors 48 and 50 are also connected to the base of an NPN transistor 60. The collectors of the transistors 52 and 54 are connected to the base of an NPN transistor 62. The collector of the transistor 60 is connected to pin no. 6 of the comparator 30. A resistor 64 is connected in series between the collector of the transistor 62 and pin no. 6 of the comparator 30. The collector of the transistor 62 is also connected to the base of an NPN transistor 66, and the collector of the transistor 66 is connected to pin no. 6 of the comparator 30.

A resistor 68 is connected between pin no. 6 of the comparator 30 and the base of an NPN transistor 70. The collector of the transistor 70 is connected to pin no. 6 of the comparator 30. The emitter of the transistor 70 is connected to pin no. 5 of the comparator 30.

The emitters of the transistors 50 and 54 are each connected to the collector of an NPN transistor 72. A resistor 74 is connected between the emitter of the transistor 72 and pin no. 4 of the comparator 30. The base of the transistor 72 is connected to pin no. 3 of the comparator 30. Diodes 76 and 78 and a resistor 80 are connected in series between the base of the transistor 72 and pin no. 4 of the comparator 30.

The emitters of the transistors 60 and 62 are interconnected and a resistor 82 is connected in series to pin no. 3 of the comparator 30. A resistor 84 is also connected from pin no. 3 of the comparator 30 to the base of an NPN transistor 86. A diode 100 is connected between the base of the transistor 86 and pin no. 4 of the comparator 30. The emitter of the transistor 86 is connected to pin no. 4 of the comparator 30. A resistor 90 is connected between the emitter of transistor 66 and the collector of transistor 86 and a resistor 92 is connected between the collector of transistor 86 and pin no. 5 of the comparator 30.

The collector of transistor 86 is connected to the base of an NPN transistor 94, while the collector of the transistor 94 is connected to the base of the transistor 70. The emitter of the transistor 94 is connected to the base of an NPN transistor 96. The collector of the transistor 96 is then connected to pin no. 5 of the comparator 30 and the emitter of transistor 96 is connected to pin no. 4 of the comparator 30. A diode 98 is connected between the base of the transistor 96 and pin no. 4 of the comparator 30. A diode 100 is connected between the base of transistor 86 and pin no. 4 of the comparator 30.

Figure 2:
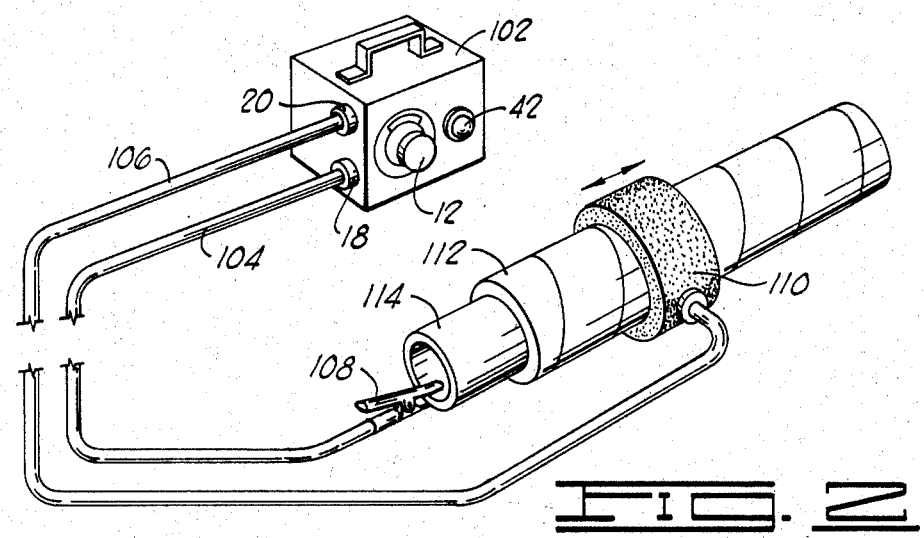
FIG. 2 is a perspective view of the apparatus of the present invention.

The electronic circuitry described above may be suitably housed in a rectangular container or a box having dimensions of approximately 6 inches by 5 inches by 4 inches. Such a cabinet is illustrated in FIG. 2 and is designated by the reference character 102. Such a cabinet may be readily transported or carried about by the operator when checking the resistivity of the non-conducting coating on a metallic pipe or vessel.

In a preferred embodiment, suitable flexible insulated electrical conduits or cables 104 and 106 are connected respectively to the first and second probe terminals 18 and 20. The conduits 104 and 106 may each suitably be of approximately 25 feet in length and are preferably constructed of low-resistance heavy-gauge insulated copper wire. The conduit 104 preferably includes a suitable connector or clamp 108 connected to the outer end thereof for connection to the metallic pipe or vessel. A conventional spring-type alligator battery clamp may be utilized for this purpose. However, other types of clamps or electrical connecting means may be utilized for various applications.

A suitable probe 110 is electrically connected to the outer end of the conduit 106. The probe 110 is adapted to provide electrical contact with the surface of the non-conducting coating on the pipe or vessel. The probe 110 preferably employs a sponge formed of felt or the like which is saturated with a suitable electrolyte. A solution of potassium chloride has been found to be a suitable electrolyte for this purpose. The electrolyte may also include a small amount of soapy water, as a wetting agent, to reduce the surface tension on the non-conducting coating and improve the electrical contact between the probe 110 and the surface of the non-conducting coating.

One form of probe 110, suitable for use with the present invention, employs an annular sponge, as shown in FIG. 2, having an inside diameter approximately equal to the diameter of the non-conducting coating 112 on a pipe 114, saturated with potassium chloride, or the like, and suitable for longitudinal movement along the outer surface of the pipe coating for checking the resistivity of the non-conducting coating.

Another suitable form of probe utilizes a felt sponge saturated with potassium chloride, or the like, and having a contact diameter of approximately one-fourth inch. Such a probe is ideally suited for locating the exact position of a holiday in the non-conducting coating in a pipe or vessel. Other suitable forms of probes include a sponge having a rectangular contact surface area of approximately 4 inches by 8 inches secured to a handle of approximately four feet in length for use in checking the non-conducting coating of large vessels or large-diameter pipes.

Owing to the extremely low current requirements of the circuit of the present invention, the positive and negative d.c. voltage sources may each be suitably provided by a respective conventional nine volt transistor radio battery. A six volt transistor radio battery may also be used for the battery 46. The d.c. voltage source 10 is preferably provided by a conventional 67.5 volt transistor circuit battery.

OPERATION

The first step in operation of the present invention is to calibrate the potentiometer 12 to the proper resistivity standard. Assuming that the appropriate minimum resistivity of a non-conducting coating on a metallic vessel or a pipe is 80 K at 67.5 volts, the standard calibration resistance will then be an 80 K, 0.01 percent resistor.

The clamp 108 and probe 110 are connected respectively to the opposite ends of the standard resistor (not shown). The potentiometer 12 is then adjusted from its lowest resistance value increasingly until the indicator light 42 is illuminated and the alarm 44 sounds. At this point, calibration is complete and the calibration resistor can be disconnected from the probe 110 and clamp 108.

After calibration, the present invention is ready to be used to check the resistivity of non-conducting coatings on metallic vessels or pipes. Assuming that the coating on a pipe is to be checked, the clamp 108 is first clamped to the metallic portion of the pipe to provide suitable electrical connection thereto, as shown in FIG. 2. The probe 110, saturated with a solution of potassium chloride and a small amount of soapy water, is then applied to the surface of the non-conducting coating. When the resistivity of the coating exceeds the minimum standard resistance of 80 K, no signal will emanate from the light 42 and the audible alarm 44. When, however, the probe 110 contacts a portion of the coating having a holiday formed therein, thus reducing the resistivity of the coating below a minimum of 80 K, the indicator light 42 and the audible alarm 44 will be activated thus providing the operator with the location of the holiday in the non-conducting coating.

Referring now to FIG. 1, when the resistance between the probe 110 and clamp 108, and therefore the terminals 18 and 20, is greater than the calibrated resistance of the potentiometer 12, the current flow through resistors 14 and 16 from the d.c. voltage source 10 to ground is greater than the current flow through the resistors 22 and 24 from the d.c. voltage source 10 to ground. This difference in current flow causes the base of the transistor 48 to be positive with respect to the base of the transistor 52 thus causing the transistors 48 and 50 to conduct. The current flowing through the transistor 50 biases the transistor 54 such that there is virtually no current flow through transistor 54. Current flowing through the transistor 50 also flows through transistor 72 and resistor 74 to the negative 9 volt d.c. source.

The current flowing through transistor 50 causes transistor 60 to conduct, while the transistor 62 is essentially turned off due to the inhibited current flow through transistor 54. Current flows from the positive 9 volt d.c. source through the transistor 60 and resistor 82 to ground. Since virtually no current is flowing through transistor 62, transistors 66, 94, 70 and 96 are not conducting. Therefore, there is no current flow across resistor 38 to turn on transistor 40 and activate indicator light 42 and audible alarm 44, when transistor 60 is conducting and transistor 62 is turned off.

When the measured resistivity of the non-conducting coating falls below the specified standard, in this case 80 K, the current flow through resistors 22 and 24 is greater than the current flow through resistors 14 and 16. When this occurs, transistors 52 and 54 begin conducting and transistor 50 essentially shuts off all current flow therethrough. As the current flows through transistor 54, transistor 62 is turned on and begins conducting while transistor 60 is biased such that it no longer conducts current therethrough.

As current flows through resistor 64 and transistor 62 through resistor 82 to ground, transistor 66 is turned on, thus conducting current therethrough and through resistors 90, 92 and 38 to ground. Transistor 86 also conducts current therethrough to the minus 9 volt d.c. source.

As current flows through transistor 86, transistor 94 is turned on thus conducting current therethrough from the positive 9 volt d.c. source through resistor 68 and through diode 98 to the negative 9 volt d.c. source. This latter current flow renders transistor 70 conductive thus allowing current to flow therethrough from the positive 9 volt d.c. source through resistor 38 to ground and also allows current flow through transistor 96, when conducting, to the negative 9 volt d.c. source.

As current flows through resistor 38 to ground, transistor 40 is rendered conductive thus permitting current from the 6 volt d.c. source 46 to flow through the indicator light 42 and the audible alarm 44 thus indicating the presence of a holiday in the non-conducting coating being tested.

It will be readily seen that the above-described holiday detector and coating resistivity checker provides a small, economical, resistivity checker which may be readily calibrated and provides rapid and precise indication of the presence of holidays in a non-conducting coating on a metallic vessel or pipe. It will also be readily apparent that changes may be made in the combination or arrangements of parts or elements as heretofore set forth in the specification and shown in the drawing without departing from the spirit and scope of the invention as defined in the following claims.

What is claimed is:

1. An apparatus for automatically comparing the resistivity of a non-conducting coating on a metallic vessel or the like to a predetermined standard minimum resistance, and providing indication where the resistivity of the non-conducting coating falls below the predetermined standard minimum resistance, comprising:
   a voltage source;
   electronic resistance bridge circuit means having first and second legs electrically connected in parallel to said voltage source;
   variable resistance means in the first leg of said resistance bridge circuit means and electrically connected in series between said voltage source and the first side of said resistance bridge circuit means;
   probe means in the second leg of said resistance bridge circuit means and electrically connected in series between said voltage source and the second side of said resistance bridge circuit means, said probe means being adapted to connect the metallic vessel and the non-conducting coating in series between said voltage source and the second side of said resistance bridge circuit means;

comparator means electrically connected to the first side and the second side of said resistance bridge circuit means for comparing the current flowing through the metallic vessel and the non-conducting coating with the current flowing through said variable resistance means, and providing a signal output when the current flowing through the metallic vessel and the non-conducting coating is greater than the current flowing through said variable resistance means; and indicator means electrically connected to said comparator means and responsive to the signal output therefrom for indicating the presence of the signal output from said comparator means.

2. The apparatus as defined in claim 1 wherein said indicator means is characterized further to include visual indicator means.

3. The apparatus as defined in claim 1 wherein said indicator means is characterized further to include audible indicator means.

4. The apparatus as defined in claim 1 wherein said indicator means is characterized further to include visual and audible indicator means.

5. The apparatus as defined in claim 1 wherein said comparator means comprises:
a unitary circuit comprising a plurality of semiconductor devices and resistors;
a positive d.c. voltage source applied to said unitary circuit; and
a negative d.c. voltage source applied to said unitary circuit.

6. The apparatus as defined in claim 5 wherein said indicator means is characterized further to include:
a transistor having the base thereof, electrically connected to the signal output of said comparator means, and having the emitter thereof grounded;
resistor means connected in series between the base of said transistor and ground;
audible indicator means connected in series with the collector of said transistor; and,
a voltage source connected in series with said audible indicator means.

7. The apparatus as defined in claim 6 wherein said indicator means is characterized further to include:
visual indicator means connected in parallel with said audible indicator means.

8. The apparatus as defined in claim 1 wherein said probe means is characterized further to include:

electrical connector means for providing electrical connection to the metallic vessel; and,
sponge means, saturated with an electrolyte, for providing low-resistance electrical connection to the non-conducting coating.

9. The apparatus as defined in claim 8 wherein said metallic vessel is in the form of a metallic pipe and said sponge means is characterized further to include:
an annular sponge sized to conform to the outer periphery of the non-conducting coating on the metallic pipe.

10. The apparatus as defined in claim 1 wherein said variable resistance means is characterized further to include:
visual indicator means for displaying the resistance value to which said variable resistance means is set.

11. A method of checking the resistivity of a non-conducting coating on a metallic vessel or the like and detecting holidays in said coating, comprising the steps of:
applying a known d.c. voltage across a standard resistance and across the non-conducting coating and metallic vessel connected in parallel;
comparing the current flowing through the standard resistance with the current flowing through the non-conducting coating and metallic vessel;
detecting when the current flowing through the non-conducting coating and metallic vessel is greater than the current flowing through the standard resistance; and
providing indication when the current flowing through the non-conducting coating and metallic vessel is detected to be greater than the current flowing through the standard resistance.

12. The method as defined in claim 11 wherein the step of providing indication is characterized further to include:
providing an audible signal when the current flowing through the non-conducting coating and metallic vessel is detected to be greater than the current flowing through the standard resistance.

13. The method as defined in claim 11 wherein the step of providing indication is characterized further to include:
providing audible and visible signals when the current flowing through the non-conducting coating and metallic vessel is detected to be greater than the current flowing through the standard resistance.

* * * * *